United States Patent [19]

Brock et al.

[11] Patent Number: 4,940,636
[45] Date of Patent: Jul. 10, 1990

[54] OPTICAL INTERFERENCE FILTER

[75] Inventors: Lieselotte Brock; Gunter Frank; Bruno Vitt, all of Aachen, Fed. Rep. of Germany

[73] Assignee: U.S. Philips Corporation, New York, N.Y.

[21] Appl. No.: 223,463

[22] Filed: Jul. 21, 1988

[30] Foreign Application Priority Data

Jul. 22, 1987 [DE] Fed. Rep. of Germany ....... 3724216

[51] Int. Cl.$^5$ .............................................. B32B 17/06
[52] U.S. Cl. ................................... 428/426; 350/164; 428/432; 428/701
[58] Field of Search ...................... 428/701, 432, 426; 350/1.6, 311, 164, 166; 252/584

[56] References Cited

U.S. PATENT DOCUMENTS

| | | | |
|---|---|---|---|
| 2,982,668 | 5/1961 | Guenther et al. | 428/701 X |
| 3,244,547 | 4/1966 | Ori et al. | 428/432 X |
| 3,356,522 | 12/1967 | Libbert | 428/701 X |
| 3,646,359 | 10/1969 | Apfel et al. | 428/426 |
| 3,657,063 | 4/1972 | Brown et al. | 428/701 X |
| 3,853,386 | 12/1974 | Ritter et al. | 428/701 X |
| 3,934,961 | 1/1976 | Itoh et al. | 428/701 X |
| 3,984,581 | 10/1976 | Dobler et al. | 350/164 |
| 4,098,956 | 7/1978 | Blickensderfer et al. | 428/432 |
| 4,099,840 | 7/1978 | Van der Wal et al. | 350/166 |
| 4,101,707 | 7/1978 | Henry | 428/701 X |
| 4,160,061 | 7/1979 | Ohino et al. | 428/432 X |
| 4,340,646 | 7/1982 | Ohno et al. | 428/432 |
| 4,399,194 | 8/1983 | Zelez et al. | 428/701 X |
| 4,556,599 | 12/1985 | Sato et al. | 428/432 |
| 4,640,867 | 2/1987 | Oyama et al. | 428/701 X |
| 4,647,812 | 3/1987 | Vriens et al. | 350/1.6 |
| 4,663,557 | 5/1987 | Martin, Jr. et al. | 350/1.6 |
| 4,769,290 | 9/1988 | Hettich et al. | 428/701 X |
| 4,805,989 | 2/1989 | Nakajima | 350/164 |
| 4,834,857 | 5/1989 | Gillery | 428/432 X |
| 4,874,664 | 10/1989 | Hamaguchi et al. | 428/432 |

FOREIGN PATENT DOCUMENTS 0178207  11/1982  Japan .................................. 428/432

Primary Examiner—Ellis P. Robinson
Assistant Examiner—Archene A. Turner
Attorney, Agent, or Firm—John C. Fox

[57] ABSTRACT

The optical interference filter is assembled from alternating amorphous $SiO_2$ layers and layers made of mixed oxides chosen from 88–95 mole.% $TiO_2$ and 5–12 mole.% $ZrO_2$,
88–95 mole.% $TiO_2$ and 5–12 mole.% $HfO_2$,
$TiO_2 \cdot ZrO_2 \cdot HfO_2$, $TiO_2 \cdot Nb_2O_5$
$TiO_2 \cdot Ta_2O_5$ and $Ta_2O_5 \cdot 2TiO_2$.

The mixed oxides have a crystal structure which corresponds to the crystal structure obtained after a heat treatment between 700 and 1100° C. The filter is stable, also after a long period at an elevated temperature.

8 Claims, 6 Drawing Sheets

OPTICAL INTERFERENCE FILTER

FIELD OF THE INVENTION

The invention relates to an optical interference filter having an alternating sequence of first low-refractive index layers and second high-refractive index layers on a glass substrate, the first layers basically consisting of amorphous $SiO_2$ and the second layers being crystalline layers, basically consisting of $TiO_2$ and a second metal oxide, the second metal oxide being chosen from a group to which $ZrO_2$, $HfO_2$ and $Ta_2O_5$ belong.

BACKGROUND OF THE INVENTION

JP-A-No. 59-184 744 describes a method in which high-refractive index layers of $ZrO_2$ and/oz $TiO_2$ and low-refractive index layers of $SiO_2$ and/or $Al_2O_3$ are provided on a glass substrate by alternating vacuum deposition. A heat treatment above approximately 450° C., preferably 650° to 700° C., produces diffused layers approximately 3 to 10 nm thick, in between the aforesaid layers which improve the resistance to wear.

An interference mirror having an alternating layer sequence of mixtures of $TiO_2$ and $HfO_2$, $TiO_2$ and $ThO_2$ or $ThO_2$ and $HfO_2$ on the one hand and $SiO_2$ on the other hand is disclosed in SU-A-No. 306 520. This interference mirror has a higher resistance to radiation from optical quantum generators than mirrors comprised of an alternating sequence of layers of $TiO_2$ and $SiO_2$. The layers are from ethoxide or salt solutions produced by means of a dip immersion method, respectively, and are subjected to heat treatments at 400° C. for the mixed oxide layers and 500° C. for the $SiO_2$ layers.

JP-A-No. 59-102 201 discloses optical interference coatings consisting of an alternating layer sequence of $Ta_2O_5$ and/or $TiO_2$ on the one hand and $SiO_2$ on the other hand, some of these layers or all the layers optionally containing $P_2O_5$. The layers are produced from corresponding metal-organic compounds while being heated to 200° or 550° C., respectively. Because of the fact that the top layer consists of $Ta_2O_5$ or $Ta_2O_5+TiO_2$ a high resistance against salt water, high temperatures and high humidity is obtained.

All the layer sequences known from said documents have in common that the $TiO_2$-containing layers are not crystalline because of the comparatively low temperatures used during the heat treatment. DE-A-No. 334 962 discloses that non-crystalline $TiO_2$ layers are obtained at 500° C. while crystalline $TiO_2$ is not produced until 600° C. (anatase) or 900° C. (rutile).

DE-A-No. 3 227 096 describes an optical interference filter for applications at over 500° C., which is comprised of an alternating sequence of, for example 27 layers of $Ta_2O_5$ and $SiO_2$. The $Ta_2O_5$ layer may optionally include a low percentage of a different refractory oxide, for example $TiO_2$. A heat treatment at temperatures below 1100° C. produces a visible light-transmissive infrared-reflecting filter which is converted into a filter which scatters visible light and reflects infrared light when the layer sequence is heated for several hours to at least 1100° C. in air.

Optical interference filters are used in, for example, laser technology. Optical filters are also used with incoherent light sources such as qas discharge lamps and halogen lamps to increase the luminous efficacy of the lamps, as color filters or colour correction filters and also as reflectors. When used with lamps, technically the most difficult problem is the manufacture of more efficient heat reflectors for the near infrared wavelength ranqes (0.75 to approximately 3.5 μm).

For the material for the bulbs of such halogen incandescent lamps, quartz glass is the most suitable material, which does not start to crystallize until at temperatures above 1100° C. In special cases doped quartz qlass or hard qlasses can alternatively be used.

The choice of $SiO_2$ as the low refractive index filter material is based on the fact that the optical efficacy of an interference filter increases with increasing refractive index difference between the high and low refractive index materials and that $SiO_2$ has one of the lowest refractive indices, (n=1.45).

The choice of materials with high refractive indices for the construction of a filter is determined by the following criteria:
  (a) it must have the highest possible refractive index;
  (b) it must have an adequate adhesion to amorphous $SiO_2$ (a-$SiO_2$);
  (c) it must have the lowest possible thermal coefficient of expansion.

Since a $SiO_2$ has a linear thermal coefficient of expansion of only $0.5 \times 10^{-6} K^{-1}$, too high an expansion coefficient of the high refractive index material induces high stresses which when the filter is subjected to heat, result in cracking and destruction. Experience has taught that these effects are increasingly more serious for filters with an increasing filter thickness or an increasing number of layers, respectively.

If possible, no phase transformations should occur in the temperature range of interest, which may have an upper limit of for example 900° or 1100° C. Recrystallisation usually leads to the formation of microcracks, which for optical filters, cause unwanted light dispersion.

SUMMARY OF THE INVENTION

The invention has for its object the provision of an interference filter having an alternating sequence of first low-refractive index layers and second high-refractive index layers on a glass substrate, the first layers consisting substantially of amorphous $SiO_2$ and the second layers consisting of $TiO_2$ and a second metal oxide wherein, also when a large number of layers are used, both cracking and peeling off as well as crystallographic phase transitions are suppressed.

According to the invention, this object is accomplished in that the material of the second layer is a mixed oxide chosen from the group consisting of
  88–95 Mole. % $TiO_2$ and 5–12 Mole. % $ZrO_2$,
  88–95 Mole. % $TiO_2$ and 5–12 Mole. % $HfO_2$,
  $TiO_2.ZrO_2$, $TiO_2.HfO_2$, $TiO_2.Nb_2O_5$,
  $TiO_2.Ta_2O_5$ and $Ta_2O_5.2 TiO_2$,
and mixtures or combinations of these materials, the crystal structure of the second layers corresponding to a crystal structure obtained in a heat treatment at a temperature between 700° and 1100° C.

The duration of the heat treatment is 2 to 10 minutes, for example, 3 to 5 minutes.

The invention provides a thermo-mechanical and optical long-term stability at high, operating temperatures of up to, for example 900° or 1100° C. at an overall thickness of the high refractive index metal oxide layers of at least up to 2 micrometers.

BRIEF DESCRIPTION OF THE DRAWING

Embodiments of the invention will now be described in greater detail with reference to the accompanying drawings. In the drawings.

DETAILED DESCRIPTION OF THE PREFERRED EMBODIMENTS

EXAMPLE 1

Production and properties of single layers of $TiO_2$-$HfO_2$ 0.5 molar hafnium ethoxide solution and 0.5 molar titanium oxide solution in ethanol which is acidified with HCl, are mixed to obtain $Ti_xHf_{1-x}O_2$, wherein x=0/0.37/0.50/0.625/0.75/0.815/0.88/0.92/0.95/0.98/ as well as 1.0 (as a reference).

Mixed oxide layers of different compositions and a thickness of approximately 0.055 μm (±10%) are produced in an immersion process in which quartz glass tubes were used as substrates. The tubes were withdrawn from the liquid at a speed of 3.5 mm/s, and given a subsequent heat treatment for five minutes at 900° C. or 1100° C. in an air atmosphere. For an optical λ/4-layer of a thickness of 0.11 μm (λ=1.1 μm for the case of infrared-reflecting filters) two immersion processes were consequently required.

Pure hafnium oxide layers (x=0) produced in this manner are of an optically poor quality. Only when low-molar solutions (0.16 mol/l) and 6 instead of 2 immersion procedures are used, optically reliable layers were obtained whose refractive index in the infrared, however reaches only 1.85 or 1.95, depending on the heat treatment temperature (900°, 1100° C.) The same holds for the ratio of mix x=0.37, in which also more than two immersion procedures are required and refractive indices of only 1.92 or 2.0 are obtained.

In contrast thereto, it was possible to produce $TiO_2$-$HfO_2$ layers in the range of ratios of mix from x=0.50 to 0.98 with a high optical brightness. The 0.11 μm thick layers are free from cracks, highly reflecting and, even after being treated at a temperature of 1100° C., evidence no or substantially no dispersion.

Figure 1:
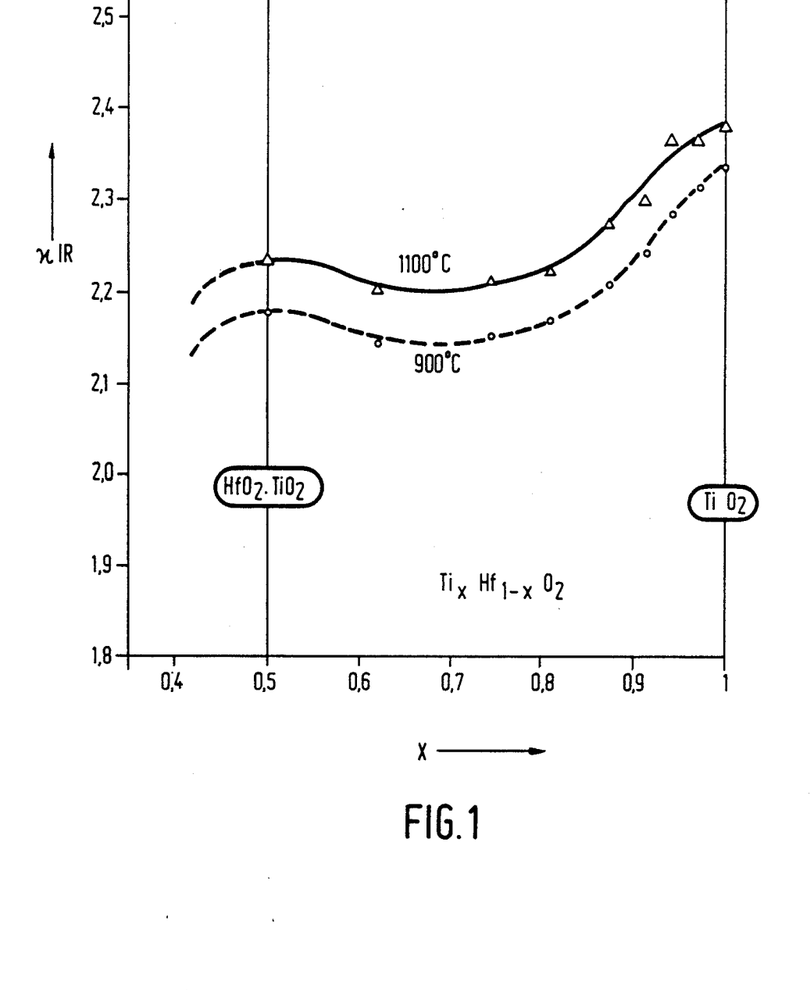
FIG. 1 is a diagram showing the variation of the refractive indices of titanium-hafnium-mixed oxide immersion-produced layers as a function of the ratios of mix at two different temperatures.

The refractive indices nIR of the $Ti_xHf_{1-x}O_2$ immersion-produced layers (at λ≈1 μm) are shown in FIG. 1 as a function of the ratios of mix x. The broken-line curve summarizes the result after a 900° C. heat treatment, (5 minutes), the solid line after an 1100° C. heat treatment (5 minutes). In the latter case, layers having higher refractive indices were obtained, which may be caused by a lower porosity. Starting at pure titanium oxide, the refractive index first generally decreases with increasing hafnium doping, then passes through a flat minimum at x≈0.7 and then slightly increases until the hafnium titanate $HfTiO_4$ composition is reached. It should be noted that heat treatment temperatures above 1100° C. are not of any practical use because of a possible recrystallisation of the quartz glass substrate.

EXAMPLE 2

Manufacture and properties of $Ti_xHf_{1-x}O_2$/$SiO_2$ filters

Using some of the titanium-hafnium immersion solutions in accordance with Example 1 (x=0.98/0.95/0.92/0.88/0.75/0.50 corresponding to 2/5/8/12/25/50 mole. % Hf) infrared-reflecting filters composed of 18 layers were deposited on the exterior side of quartz glass tubes (exterior diameter 10 mm).

The filter design had the layer sequence; Substrate H L H L H L H L H 2L H 2L H 2L H 2L H L/2, H denoting a high-refractive index $TiO_2$-$HfO_2$-layer having, an optical λ/4 thickness, so that $n_H.d_H$=λ/4 (λ=1.1 μm), and consequently $d_H$≈0.11 μm. Likewise, L denotes a low-refractive index $SiO_2$ layer with a λ/4 thickness, so that $n_L.d_L$=λ/4, where $n_L$=1.45 and $d_L$=0.19 μm. The designations 2L and L/2 indicate layers of twice and half the thickness, respectively.

The crystal structures in the high refractive index layers of the filter were examined with the aid of X-ray diffractometry. It was found that after a heat treatment at 900° C. the layers having the composition x=0.98/0.95/0.92/0.88 (2 to 12 mole. % Hf) are all single-phase compositions and have the crystal lattice of anatase. For x=0.88 a fully untextured anatase layer was obtained, that is to say the crystal orientations are spatially fully statistically distributed. In this situation the a-axis, within the error limits is unchanged compared to $TiO_2$-anatase, while the tetragonal c-axis is extended by 1.0%.

Figure 2A:
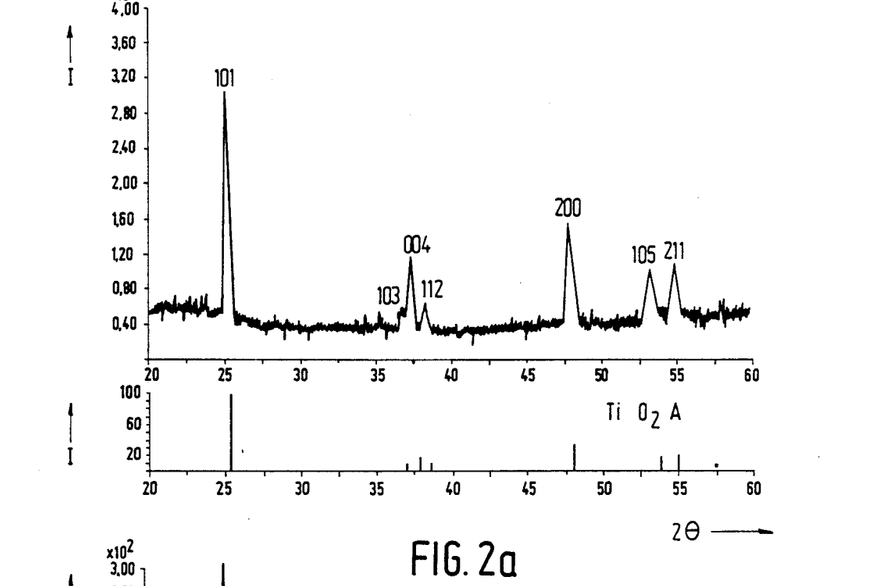
FIGS. 2a and 2b are X-ray diffraction diagrams of 18-layer IR-filters comprising $Ti_{0.88}Hf_{0.12}O_2$-layers.
Figure 2B:
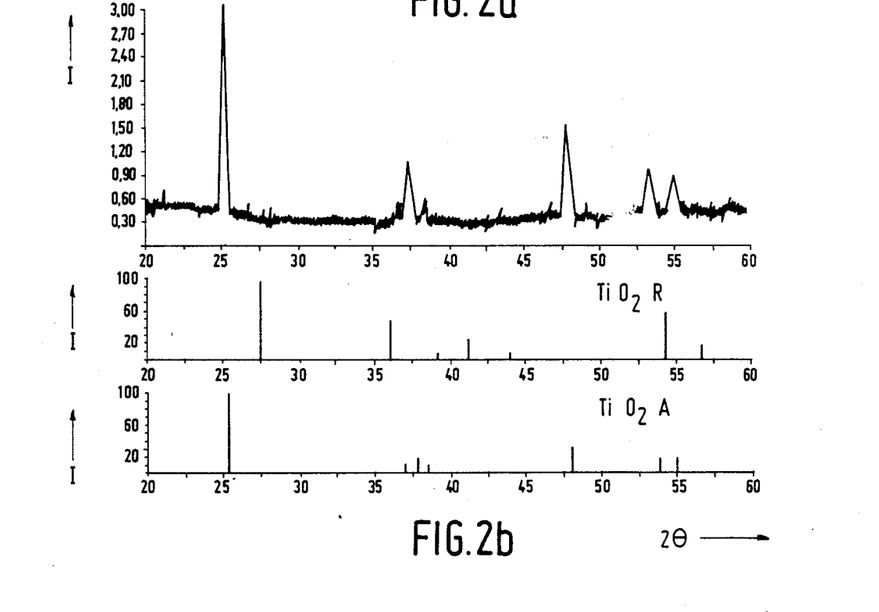

FIGS. 2a and 2b show X-ray diffraction diagrams of an 18-layer filter containing 12 mole % Hf in the high refractive index layers (x=0.88) after heat treatment at 900° C. (FIG. 2a) and 1100° C. (FIG. 2b), I denoting the intensity (in arbitrary units) and 2θ denoting diffraction angles. Line spectra for a=anatase, R=rutile are shown below the diagrams for the purpose of comparison. Apparently, the anatase structure is preserved after a heat treatment at a temperature of 1100° C., with no phase transition to the rutile structure.

Figure 3A:
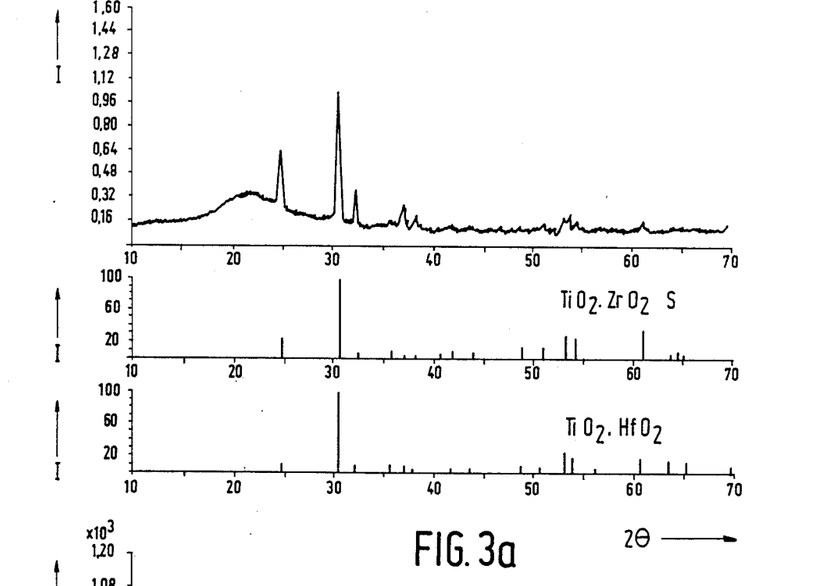
FIGS. 3a and 3b are X-ray diffraction diagrams of $HfTiO_4$ layers produced by an immersion method on quartz glass.
Figure 3B:
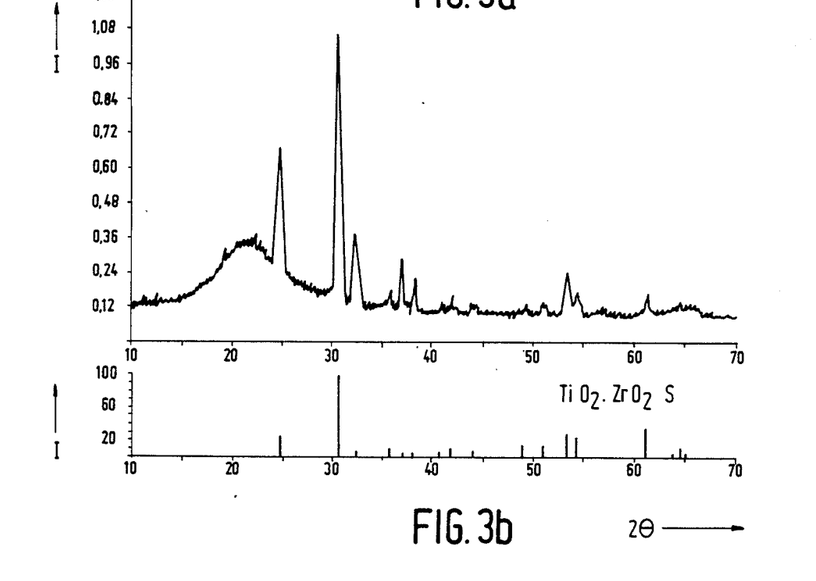

After having been heat treated at 900° C., layers of the composition 0.815/0.75/0.625 (18.5 to 37.5 mole. % Hf) are dual-phase layers with anatase and hafnium titanate as the phases, but are nevertheless optically bright. The ratio of x=0.50 is single-phase and was identified as weakly structured hafnium titanate $HfTiO_4$ with the structure of srilankite $ZrTiO_4$, which has the orthorhombic α-$PbO_2$ structure the same as that reported in the literature for $HfTiO_4$. The X-ray diagrams obtained at 900° C. and at 1100° C. of an 18-layer filter with $HfTiO_4$, are shown in the FIGS. 3a and 3b. The known line of spectra for $TiO_2.HfO_2$ and S=srilankite are included in FIGS. 3a and 3b. Again, the same crystal structure was realised for both heat treatment temperatures. Thickness of each single layer was: 1.1 μm.

Figure 4A:
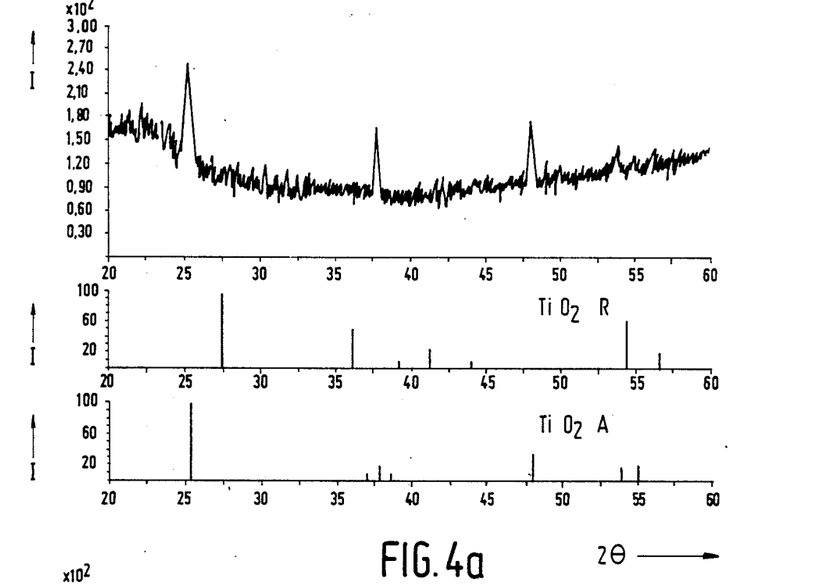
FIGS. 4a and 4b are X-ray diffraction diagrams of undoped $TiO_2$ layers produced by immersion on quartz glass.
Figure 4B:
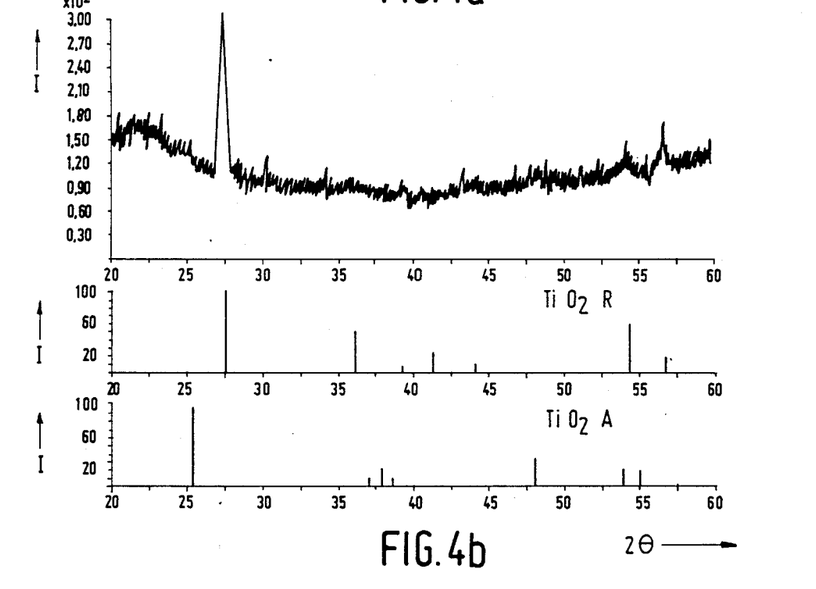

In FIGS. 4a and 4b, the X-ray diffraction diagrams of pure (undoped) $TiO_2$ immersion layers (single layers, heat-treated for 5 minutes at 900° C. (FIG. 4a) and 1080° C. (FIG. 4b)) are shown. At 900° C. pure anatase is obtained, at 1080° C. pure rutile. In both cases a clear texture is obtained. Such rutile single produced by means of an immersion procedure show visible dispersion. which increases in the cases of larger numbers of layers so that unserviceable filters are obtained. It seems to be irrelevant whether rutile is obtained via a thermal after-treatment of anatase layers or via a "direct" procedure.

Something similar holds for titanium-hafnium-mixed oxide, layers having a hafnium ratio equal to approximately 8 to 50 mole. %. That is, a thermal after-treatment at 1100° C. of layers which were heat-treated at 900° C. produces the same structure as layers which were directly heat-treated at 1100° C., namely anatase or anatase and hafnium titanate respectively.

The mixed oxide having 2 to 5 mole. % Hf (x=0.98/0.95) suppresses to a significant extent the anatase-rutile transition. Samples of layers with 8 mole. % Hf or more (x≦0.92) heat-treated at 1100° C. do not contain any rutile and are free from dispersion. A solution of hafnium and titanium dioxide and consequently acts as a stabiliser for the anatase-crystal structure and can fully suppress the phase transition to the rutile structure.

Figure 5:
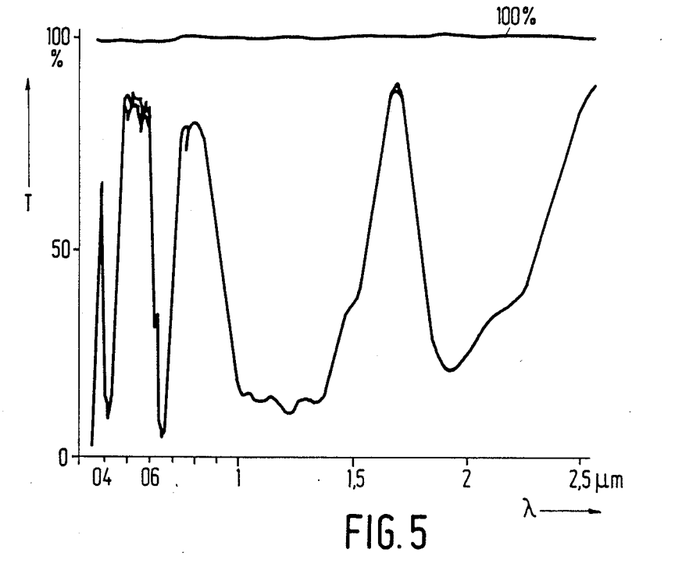
FIG. 5 is a graph showing the transmission spectrum of an 18-layer filter comprising $TiO_{0.88}Hf_{0.12}O_2$ layers on quartz glass before and after a thermal aging test.

The effect of hafnium doping is particularly striking in filters having a large number of layers: at 2 mole. % Hf there are still too many cracks, while at 5 mole. % a filter is obtained which is only a little dispersive, and which is stable when subjected to a thermal shock test between 900° C. and ambient temperature. At 12 mole. % extremely brilliant, dispersion-free filters were produced at 900° C. on quartz glass. The crack structure of this filter is characterized by large flakes and fine cracks and does not change after having been submitted for more than 2000 hours to the stability test at 900° C. The size of the flakes depends within certain limits on the quality of the substrate surface. In general imperfections produced additional cracks. Using the ratio of mix x=88 (12 mole. % Hf), further filt,ers, were produced on quartz glass at 1050° to 1100° C., these filters having the same brightness and stability. FIG. 5 shows the transmission spectrum (transmission T in percent over the wavelength λ) of such a filter (L is approximately 20% too thick) after heat treatment at 1050° C. before; solid line) and after 1100 hours in a thermal shock test at 900° C. With the error limits the spectra are identical.

Filters having the ratios of mix, x=0.75 and 0.50 (25 and 50 mole. % Hf, respectively) at 900° C. are optically comparable and have withstood the 900° C. thermal shock tests for 2000 hours without any change in the optical spectra and have also withstood an adhesive tape test. The last-mentioned ratios of mix can also be produced at an 1100° C. heat treatment temperature. However, it was found that filters having more than 18 layers and H-layers of $Ti_xHf_{1-x}O_2$, wherein x=0.75 are optically unstable.

Figure 6:
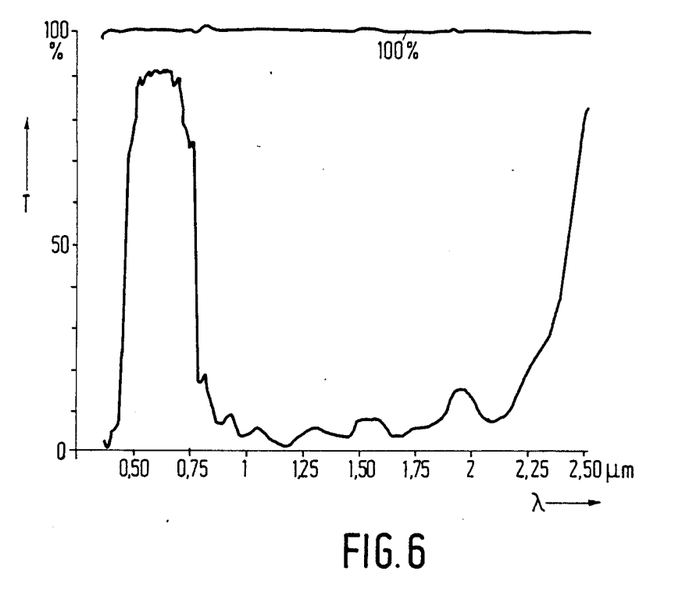
FIG. 6 is a graph similar to that of FIG. 5 for a titanium-hafnium-oxide/$SiO_2$ interference filter with 26 layers on quartz glass.

A filter structure which is particularly suitable for the immersion method had the layer thickness configuration $S(HL)^5 (H2L)^2 H L H (2LH)^2 2L2H 2L H L/2$, which had the desired performance ai an index of refraction $n_H$=2.35 and a designed wavelength of λ=1.15. FIG. 6 shows the transmission spectrum of this filter.

In the range from 5 to 12 mole. % Hf-doping and with $TiO_2.HfO_2$ an adequate stability was obtained, and the indices of refraction are above 2.30.

The hafnium-containing solutions can alternatively be effected using other alcoholates (isopropoxide or butoxide). Alternatively, alcoholic solutions of aqueous oxychloride $HfOCl_2.8H_2O$ furnish suitable optical mixed oxide layers.

The filters may alternatively be manufactured by chemical vapour deposition (CVD), whether or not at a low pressure (LPCVD), or by plasma CVD.

A further manufacturing method ior $TiO_2$-$HfO_2$ layers is the physical vapour deposition method in which titanium and hafnium are, for example, evaporated simultaneously as metals in two crucibles with the aid of electron beams and co-deposited onto a heated substrate in a reactive oxygen atmosphere.

EXAMPLE 3

Optical $TiO_2$-$Nb_2O_5$-layers and their filter combinations with $SiO_2$

Filters assembled from $Nb_2O_5$ layers and $SiO_2$ layers are indeed free from cracks but have no stability on the quartz substrate: typically, when there aze 10 layers, such filters peel off in the shape of large, thin flakes.

Mixed oxide layers $(TiO_2)_x(Nb_2O_5)_{1-x}$ having the nominal ratios of mix x=0.50 and x=0.90 (50 and 10 mole. % Nb-oxide, respectivelyl were tested. After a heat treatment of 5 minutes at 900° C., layers having a thickness of a quarter wavelength were optically bright in both cases, the refractive index was 2.24 and 2.30, respectively. X-ray diffraction measurement shows that for x=0.50 a single-phase layer was realised which corresponds to the monoclinic $Nb_2TiO_7$ which is known from the literature. When the solution of 10 mole. % $Nb_2O_5$ in $TiO_2$ is used (x=0.90), a dual-phase layer is obtained consisting of $TiO_2$ anatase and of niobium titanate $Nb_2TiO_7$. In the latter case a heat-treatment at 1100° C. causes as usual an anatase-rutile transition and a dispersive, unserviceable layer. For the case of the stoichiometrical $Nb_2TiO_7$ layers which are heat-treated at 1100° C., they also become dispersive, so that their optical serviceability is limited to temperatures below approximately 900° C.

The Ti-Nb-mixed solutions were also used to manufactuze 18-layer IR filters. While $(TiO_2)_{0.90}(Nb_2O_5)_{0.10}$/$SiO_2$ filters, (x=0.90); which were heat-treated at 900° C., did not result in any worthwhile advantage as regards stability compared with undoped $TiO_2/SiO_2$ filters (in spite of a slight reduction in the dispersion and a more favourable crack structure), filters made of $Nb_2TiO_7$ (x=0.50) had very few cracks and were stable. The crack structure of $Nb_2TiO_7$ is still more advantaqeous than the structures of the Ti-Hf mixed oxide the thermal shock test between 900° and ambient temperature does not cause any additional cracking phenomena after some 100 hours. The refractive index of the niobium titanate layers is approximately 2.24.

The manufacturing method appropriate for titanium/hafnium oxide can be used also for niobium titanate layers.

EXAMPLE 4

$Ta_2O_5$ $TiO_2$ layers and filters with quartz glass

Two solutions consisting of 0.5 molar tantalum ethoxide/ethanol and titanium ethoxide/ethanol were mixed in a ratio of volume 2:1 in order to obtain a metal mixture ratio Ta/Ti of 2. Using this ratio of mix 12-μm thick layers were produced in two immersion runs, and were heat-treated for 5 minutes at 900° C. or at 1040° C.

Layers which, when examined under an optical microscope were crack-free, and which had a refractive index at 1.10 μm of 2.24 (900° C.) and 2.26 (1040° C.) were obtained. Even when heat-treated at 1040° C. these layers were still absolutely clear and non-dispersive, which is a significant improvement compared to the (pure) oxide $Ta_2O_5$, which evidenced significant dispersion. Also, 0.36 μm thick single layers showed only very little dispersion after having been heat-treated at 1040° C.

Figure 7A:
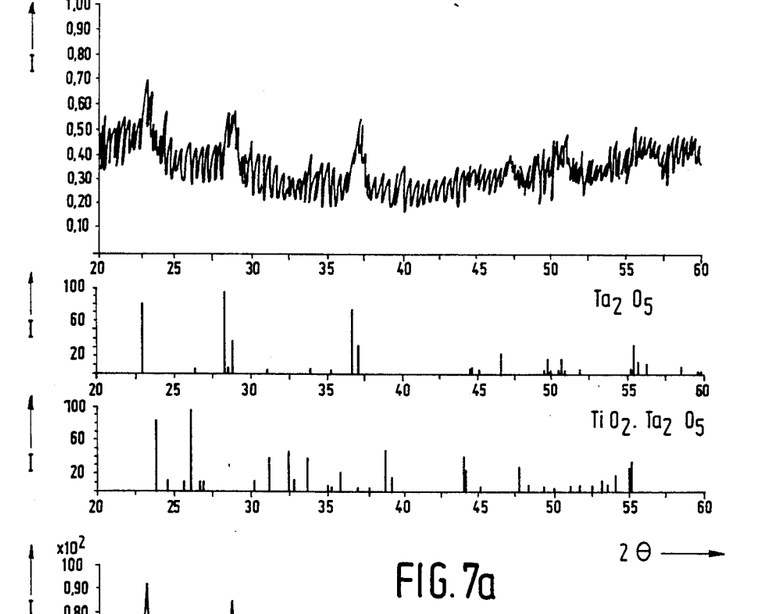
FIGS. 7a and 7b are X-ray diffraction diagrams of $Ta_2O_5TiO_2$ layers.
Figure 7B:
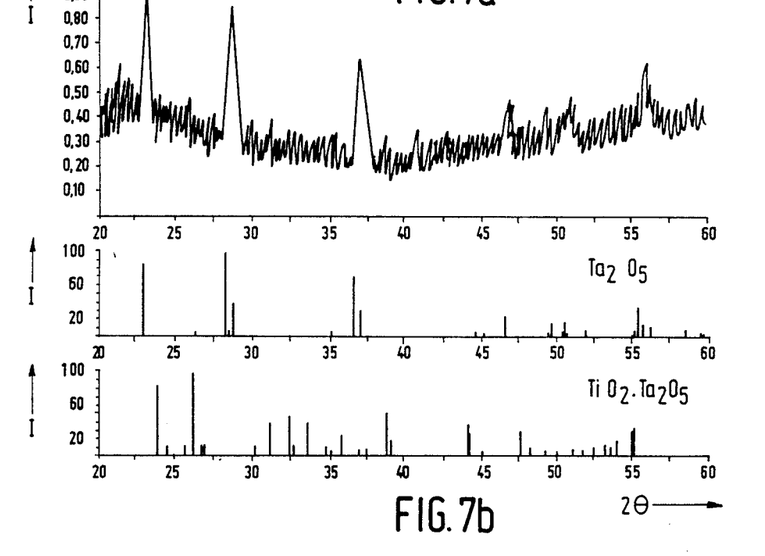

The layers are crystalline with $Ta_2O_5$ structure established by X-ray diffraction analysis, results of which are shown in FIG. 7a: (heat treatment temperature 900° C.); FIG. 7b: (heat treatment temperature 1040° C.).

Now filters consisting of crystalline $Ta_2TiO_7$ (x=0.50) layers and amorphous $SiO_2$ layers were manufactured. The $SiO_2$ immersion solution was produced by dissolving silicon ethoxide, $Si(OC_2H_5)_4$ in ethanol acidified with 78 $cm^3$/l 1-normal HCl. The molar concentration of the alkoxide in ethanol is 1.0 mole./l.

Filters having 26 layers and being of the design shown in Example 2 were manufactured without any problems at a heat-treatment temperature of 900° C. Two filters of this type were additionally coated with an 8-layer HL-stack so that filters having 34 layers were obtained. These filters have an advantageous crack structure with comparatively large flakes, which does not change even after having been submitted to a thermal shock test between 900° C. and ambient temperature for 3000 hours, which proved that they have an adequate stability, e.g., for use as high-temperature heat reflection filters. A further 26-layer filter was even provided with additional layers to a total of 40 layers.

EXAMPLE 5

$Ta_2O_5.2TiO_2 = Ta_2Ti_2O_9$ layers and filters on a quartz glass substrate

Additional Ti-solution was added to the solution used in example 4, so as to realise a metal mixture ratio of Ta/Ti=1. Layers having a thickness of 0.12 μm and having been heat treated at 900° C., (five minutes) are free from cracks and have a refractive index of 2.26, and showed little dispersion. Also thicker layers (0.36 μm) showed little dispersion. X-ray diffraction analysis showed these mixed oxide layers to be polycrystalline but dual-phase with predominantly the $Ta_2O_5$-structure and a lower proportion of $TiO_2$-anatase.

A striking feature of the Ta/Ti mixed oxides is the wide range of existence of the $Ta_2O_5$-structure in a direction towards titanium.

With this ratio of mix, (Ta/Ti=1), filters were vapour-deposited on quartz glass tubes in combination with $SiO_2$. It is possible to manufacture stable IR filters with up to 26 layers. This is probably attributable to a distinctly higher coefficient of expansion compared with $Ta_2TiO_7$. The ratio of mix Ta/Ti=1 produces, because of the dual phase and the poor stability of the filter, a material which is less suitable than $Ta_2TiO_7$, but compared with "pure" titanium dioxide has a significant advantage as regards stability.

EXAMPLE 6

Zirconium-doping

Solid zirconium ethoxide 0.5 mole. was dissolved in acidified ethanol and mixed with a solution of titanium in a ratio of 10:9 and formed into layers by the immersion technique. The 0.13 μm thick $Zr_{0.1}Ti_{0.9}O_2$-layers, which are heat-treated at 900° C. for 5 minutes, are free from cracks and dispersion-free and the refractive index at 1.1 μm=2.20. The X-ray diffraction analysis of layers heat treated at 1040° C., and at 900° C. and then thermally after-treated at 1040° C. shows that the admixture of 10 mole. % zirconium to titanium stabilizes, as does also hafnium, the anatase phase.

The manufacture of $Zr_{0.1}Ti_{0.9}O_2/SiO_2$-filters showed that it was still possible to stabilize 22 layers, so that compared with the undoped $TiO_2$ (14 to 16 layers for IR filters) an improved stability is obtained. Compared with the corresponding titanium/hafnium mixture the crack structure of this filter is, however, slightly less favourable.

What is claimed is:

1. An optical interference filter having an alternating sequence of first low-refractive index layers and second high-refractive index layers on a glass substrate, the first layers consisting essentially of amorphous $SiO_2$ and the second layers being crystalline layers and consisting essentially of $TiO_2$ and a second metal oxide, characterized in that the material of the second layers is a mixed oxide chosen from a group consisting of:
   88–95 mole. % $TiO_2$ and 5–12 mole. % $ZrO_2$,
   88–95 mole. % $TiO_2$ and 5–12 mole. % of an oxide selected from the group $HfO_2$, $TiO_2.ZrO_2$, $TiO_2.HfO_2$, $TiO_2.Nb_2O_5$, $TiO_2.Ta_2O_5$ and $Ta_2O_5.2TiO_2$ and mixtures or combinations of these materials, the crystal structure of the second layers corresponding to a crystal structure obtained in a heat treatment at a temperature between 700° and 1100° C.

2. An optical interference as claimed in claim 1 wherein said material of the second layer is 88–95 mole % $TiO_2$ and 5–12 mole % $ZrO_2$.

3. An optical filter as claimed in claim 1 wherein said material of the second layer is 88–95 mole % $TiO_2$ and 514 12 mole $HfO_2$.

4. An optical filter as claimed in claim 1 wherein said material of the second layer is $TiO_2.ZrO_2$.

5. An optical filter as claimed in claim 1 wherein said material of the second layer is $TiO_2.HfO_2$.

6. An optical filter as claimed in claim 1 wherein said material of the second layer is $TiO_2.Nb_2O_5$.

7. An optical filter as claimed in claim 1 wherein said material of the second layer is $TiO_2.Ta_2O_5$.

8. An optical filter as claimed in claim 1 wherein said material of the second layer is $Ta_2O_5.2TiO_2$.

* * * * *